United States Patent
Udriste et al.

(10) Patent No.: US 9,227,729 B2
(45) Date of Patent: Jan. 5, 2016

(54) AIRCRAFT SEAT EMPLOYING DUAL ACTUATORS FOR SEAT TRANSLATON AND SEAT RECLINE

(71) Applicant: B/E Aerospace, Inc., Wellington, FL (US)

(72) Inventors: Daniel Udriste, Coral Springs, FL (US); Javier Valdes De La Garza, Miami, FL (US); Michael Beroth, Winston-Salem, NC (US)

(73) Assignee: B/E Aerospace, Inc., Wellington, FL (US)

( * ) Notice: Subject to any disclaimer, the term of this patent is extended or adjusted under 35 U.S.C. 154(b) by 0 days.

(21) Appl. No.: 14/247,745

(22) Filed: Apr. 8, 2014

(65) Prior Publication Data

US 2014/0300162 A1   Oct. 9, 2014

Related U.S. Application Data

(60) Provisional application No. 61/809,577, filed on Apr. 8, 2013.

(51) Int. Cl.
*B64D 11/06* (2006.01)

(52) U.S. Cl.
CPC .............. *B64D 11/06* (2013.01); *B64D 11/064* (2014.12); *B64D 11/06395* (2014.12)

(58) Field of Classification Search
CPC ......................... B64D 11/064; B64D 11/0641
USPC ............................. 297/317, 320, 322, 354.13
See application file for complete search history.

(56) References Cited

U.S. PATENT DOCUMENTS

| | | | | |
|---|---|---|---|---|
| 6,059,364 A | * | 5/2000 | Dryburgh et al. | 297/354.13 |
| 6,170,786 B1 | * | 1/2001 | Park et al. | 248/274.1 |
| 6,305,644 B1 | * | 10/2001 | Beroth | 244/118.5 |
| 6,352,309 B1 | * | 3/2002 | Beroth | 297/354.13 |
| 6,478,256 B1 | | 11/2002 | Williamson | |
| 7,469,861 B2 | * | 12/2008 | Ferry et al. | 244/118.6 |
| 8,534,759 B2 | * | 9/2013 | De La Garza et al. | 297/354.13 |
| 8,616,643 B2 | * | 12/2013 | Darbyshire et al. | 297/342 |
| 2003/0080597 A1 | * | 5/2003 | Beroth et al. | 297/330 |
| 2004/0036336 A1 | * | 2/2004 | Veneruso | 297/354.13 |
| 2014/0300161 A1 | * | 10/2014 | Beroth et al. | 297/340 |

FOREIGN PATENT DOCUMENTS

| | | |
|---|---|---|
| EP | 1074468 A2 | 2/2001 |
| GB | 2476385 A | 6/2011 |
| WO | 2008/122761 A1 | 10/2008 |

OTHER PUBLICATIONS

International Search Report dated Jul. 15, 2014.

* cited by examiner

*Primary Examiner* — Elizabeth A Plummer
(74) *Attorney, Agent, or Firm* — Shumaker, Loop & Kendrick, LLP

(57) ABSTRACT

An aircraft passenger seat including a seat base frame, a seatback and a seat bottom configured to horizontally translate relative to the seat base frame, a first actuator arranged to drive seat translation, and a second actuator arranged to drive seatback recline, the dual actuators working in parallel to increase the speed of horizontal translation and combine the recline function into one continuous motion.

13 Claims, 5 Drawing Sheets

AIRCRAFT SEAT EMPLOYING DUAL ACTUATORS FOR SEAT TRANSLATON AND SEAT RECLINE

CROSS-REFERENCE TO RELATED APPLICATION

This Application claims priority from U.S. application Ser. No. 61/809,577 filed Apr. 8, 2013, the entirety of which is incorporated by reference herein.

TECHNICAL FIELD AND BACKGROUND OF THE INVENTION

The present invention relates generally to an aircraft passenger seat, and more particularly, to an aircraft passenger seat including a first actuator for seat translation and a second actuator for seatback recline, the dual actuators working in parallel to increase the speed of translation and combine the recline function into one continuous motion.

Conventional aircraft seats are typically configured to recline during flight to enhance comfort. Premium and luxury class seats may be configured to achieve a sleeping position in which the seatback reclines to horizontal to form a flat bed with the seat bottom. In conventional seat recline mechanisms, the seatback and the seat pan pivot to adjust the angles therebetween, but do not translate relative to the floor. As a result, the relationship between the seatback angle and seat pan angle is limited, and such seats require more room aft of the seat to accommodate for the reclining seat back.

As airline carriers strive to include more features, amenities and adjustability into seats, what is needed is a new seat recline mechanism in which the relationship between the angles of the seat pan and seatback is better adjustable and controllable, and the speed with which the seat reclines is increased.

BRIEF SUMMARY OF THE INVENTION

To achieve the foregoing and other aspects and advantages, in a first embodiment provided herein is an aircraft passenger seat configured to recline and including a fixed base frame, a seatback and a seat bottom supported on the fixed base frame, a first actuator driving seatback and seat bottom translation, and a second actuator driving seatback recline, wherein the first and second actuators are arranged in parallel to drive translation and seatback recline in one continuous motion.

In another aspect, the aircraft passenger seat may include a rail system including a first rail horizontally driven by the first actuator to translate the seat, and a second rail horizontally driven by the second actuator to recline the seat.

In another aspect, the first and second rails may be arranged parallel and horizontally translate relative to the fixed base frame.

In another aspect, the first rail may define a non-linear guide path for guiding movement of the seat bottom engaged therein, and the second rail may be arranged to move the seat bottom along the non-linear guide path.

In a further aspect, the seat bottom may move from a rearward end of the non-linear guide path when the second actuator is retracted and the seatback is upright, to a forward end of the non-linear guide path when the second actuator is fully extended and the seatback fully reclined.

In a further aspect, the seatback and the seat bottom may be pivotally attached, and the seatback may be attached to the first rail through a rotating link.

In a further aspect, the second actuator may be attached to a forward end of the seat bottom such that extending the second actuator moves the seat bottom forward, thereby pulling the seatback along therewith such that the rotating link rotates to recline the seatback.

In a further aspect, the first and second actuators may operate independently or together.

In a further aspect, the fixed base frame may include spaced legs and transverse forward and rear beam tubes.

According to another embodiment of the invention, the present invention provides an aircraft passenger seat configured to recline and horizontally translate including a seat base frame, a seatback and a seat bottom configured to horizontally translate relative to the seat base frame, a first actuator arranged to drive the seatback and seat bottom horizontal translation, and a second actuator arranged to drive seatback recline, the first and second actuators working in parallel to increase the speed of horizontal translation and combine the recline function into one continuous motion.

In another aspect, the aircraft passenger seat may include a rail system including a first rail horizontally driven by the first actuator to translate the seat, and a second rail horizontally driven by the second actuator to recline the seat.

In another aspect, the first and second rails may be arranged parallel and horizontally translate relative to the fixed base frame.

In another aspect, the first rail may define a non-linear guide path for guiding movement of the seat bottom engaged therein, and the second rail may be arranged to move the seat bottom along the non-linear guide path.

In a further aspect, the seat bottom may travel from one end of the non-linear guide path to the other as the seatback moves from a fully upright to a fully reclined sitting position.

In a further aspect, the seatback and the seat bottom may be pivotally attached, and the seatback may be attached to the first rail through a rotating link.

In a further aspect, the second actuator may be attached to a forward end of the seat bottom such that extending the second actuator moves the seat bottom forward, thereby pulling the seatback along therewith such that the rotating link rotates to recline the seatback.

Embodiments of the invention may include one or more or any combination of the above features and aspects.

BRIEF DESCRIPTION OF THE DRAWINGS

Features, aspects and advantages of the present invention are understood when the following detailed description of the invention is read with reference to the accompanying drawings, in which.

DETAILED DESCRIPTION OF THE INVENTION

Figure 1:
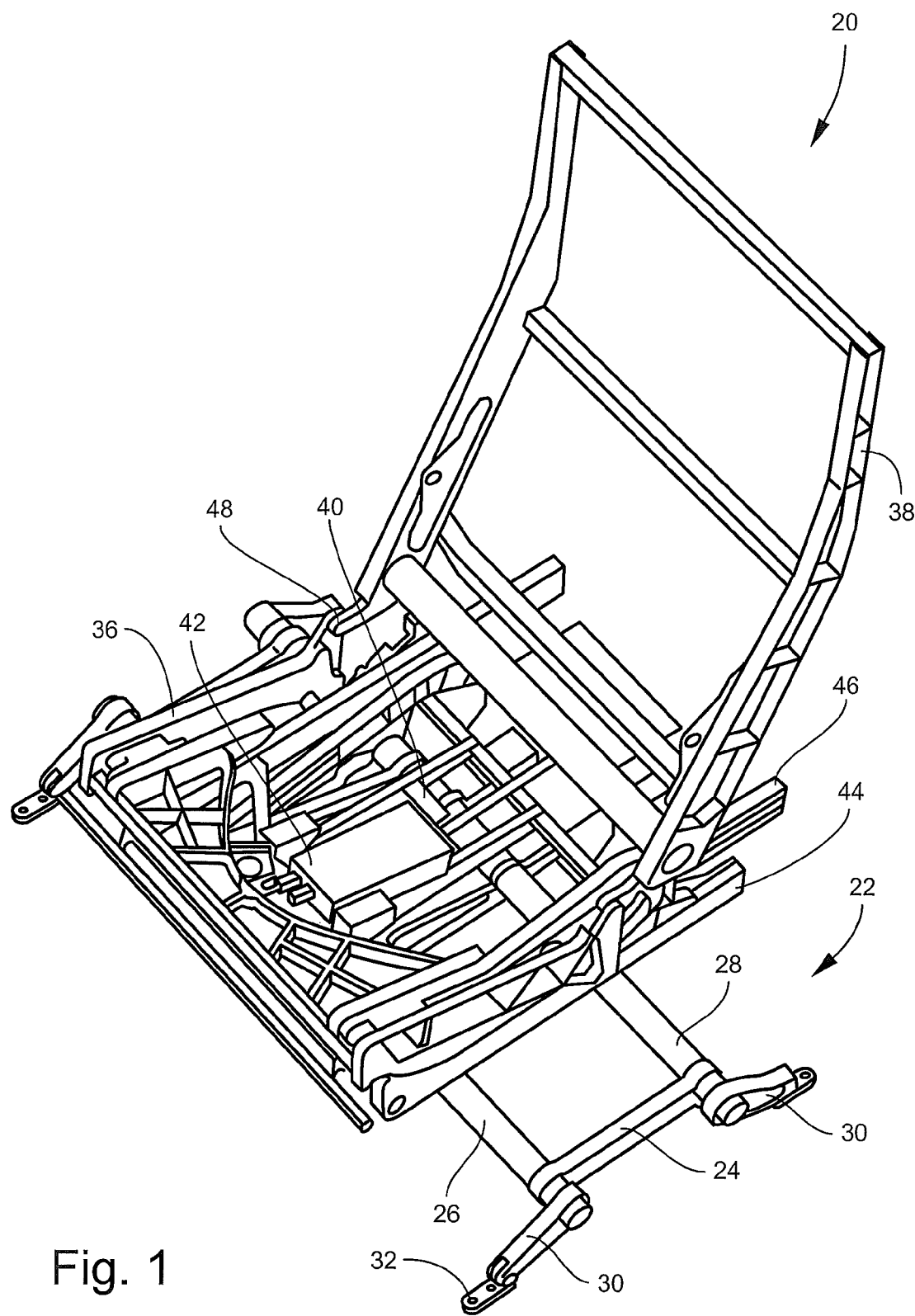
FIG. 1 is an isometric view of an aircraft passenger seat according to an embodiment of the invention shown with the seat upholstering, shrouds and other seat components removed for clarity.

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Referring to FIGS. 1-5, an aircraft passenger seat configured to horizontally translate and recline is shown generally at reference numeral 20. The seat 20 generally includes a fixed seat base frame 22 supporting the seat throughout various sitting positions. The fixed seat base frame 22 generally includes spaced left and right spreaders 24 interconnected through transverse beam tubes. As shown, the transverse beam tubes include a forward beam 26 and a rear beam 28 arranged horizontally coplanar spaced along the length of the spreaders 24. Left and right legs 30 attach to the spreaders 24 to stabilize and support the seat. Conventional track fasteners, for example, anti-rattle track fasteners 32, may be used to secure the legs 30 to the floor 34. Although in some instances a single component may be discussed herein, it should be understood that the seat includes left and right-side versions of various components to maintain the seat square and parallel throughout its range of motion.

The seat 20 includes a seat bottom 36 (or "seatpan") pivotally attached to a seatback 38, and may optionally include an actuator driven legrest (not shown). The seatpan 36 and seatback 38 are arranged and connected such that driving one component drives the movement of the other. Seatback recline is preferably driven by horizontally translating the seat bottom 36 relative to the seat base frame 22, although in an alternative embodiment the seatback 38 may be driven, thereby moving the seat bottom 36 along therewith.

The seat 20 is configured to move by way of combined translational and pivoting motion. As used herein, the terms "translation," "translating" and "translational movement" generally refer to horizontal travel in the forward and rearward (i.e., fore and aft) directions relative to the fixed seat base frame 22. Translation may include strictly horizontal travel, or a combination of horizontal and vertical travel.

A first linear actuator 40 attached to the fixed frame 22 and located beneath the seat bottom 36 drives the translating motion of the seat in the fore and aft directions. A second linear actuator 42 attached to the fixed frame 22 and located vertically above the first actuator 40 drives the seatback recline motion. In this arrangement, the seat 20 employs dual actuators that work in parallel to speed the seat translation and recline motion, which can be controlled to occur independently or simultaneously to speed seat motion.

The first actuator 40 controls fore/aft seat translation independent of seatback recline. The second actuator 42 controls seatback recline independent of horizontal translation. The reclining motion may be integrated into the translation motion such that the two motions occur in sequence, partially overlap, or are performed simultaneously. The first and second linear actuators 40, 42 can be any known actuator type configured to impart linear motion. As shown, the linear motion of the actuators 40, 42 is arranged parallel to the longitudinal axis of the seat 20.

The first actuator 40 for providing seat translation motion drives the horizontal travel of a first rail 44 (or "drive link"). The first rail 44 moves (i.e., translates) horizontally forward and rearward relative to the fixed seat frame 22. The seat 20 (i.e., seat bottom 36 and seatback 38) translates forward relative to the fixed frame 22 as the first rail 44 travels in the forward direction, and the seat 20 translates rearward relative to the fixed frame 22 as the first rail 44 travels in the rearward direction.

The second actuator 42 drives the horizontal movement of a second rail 46 (or "drive link"), which drives the seatback recline motion of the seat. The first and second rails 44, 46 are parallel and may be telescopically arranged. As the second rail 46 translates forward the seatback 38 reclines, and as the second rail 46 translates rearward the seatback 38 moves to upright. The second rail 46 is pivotally attached at one end to the front of the seat bottom 36. As the second rail 46 drives forward, it pulls the seat bottom 36 along therewith (i.e., forward), elevating the pivot 48 of the seat bottom 36 and the seatback 38, thereby changing the angles of the seat bottom and the seatback and the angular relationship therebetween. Pulling the seat bottom 36 forward consequently pulls the seatback 38 toward horizontal.

The first rail 44 defines a non-linear (i.e., curved) guide path 50 along which a seat bottom guide travels. The guide may be a roller 52, fixed to the seat bottom 36 in fixed relation to the seatback pivot 48, and arranged to travel along the guide path 50. The guide path 50 is generally arcuate shaped or curved to gradually change the seat bottom 36 angle as the roller travels along the guide path from end to end. As the seat reclines, the roller 52 travels along the guide path 50 in the direction of the forward end. The length and curvature of the guide path 50 can be customized to control the seat bottom angle and achieve desired sitting positions and angular relationships between the seat bottom 36 and seatback 38 throughout the range of the movement of the seat.

As the seat bottom 36 is pulled forward, the seatback 38 is pulled along therewith. The angle of the seatback 38 is guided by a seat back link 54 pivotally connected at a first end to the seatback 38, and pivotally connected at a second end to a main pivot link 56 pivotally connected to the forward end of the first rail 44. As the seat reclines, the translating movement of the second rail 46 ultimately causes the first end of the seat back link 54 to pivot downward, thereby lowering the seatback 38.

Figure 2:
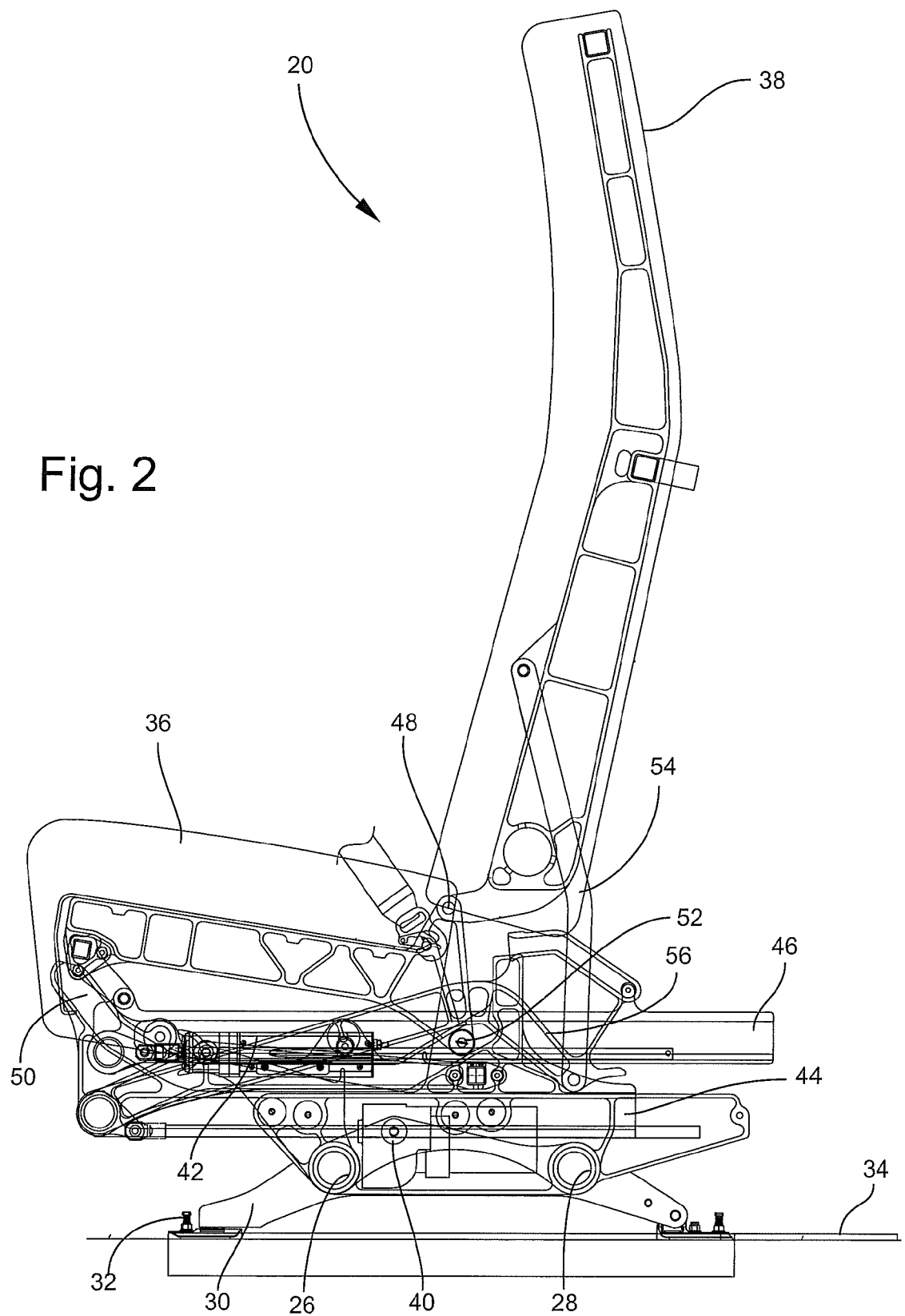
FIG. 2 is a side view of the seat of FIG. 1 with the seat shown in an upright sitting position.

Referring specifically to FIG. 2, the seat 20 is shown in an upright sitting position for taxi, takeoff and landing ("TTOL") with the seat bottom 36 aligned substantially over the underlying seat base frame 22. In this sitting position, the second rail 46 is in its rearwardmost position (i.e., fully "retracted"), and the first rail 44 is substantially in its rearwardmost position.

Figure 3:
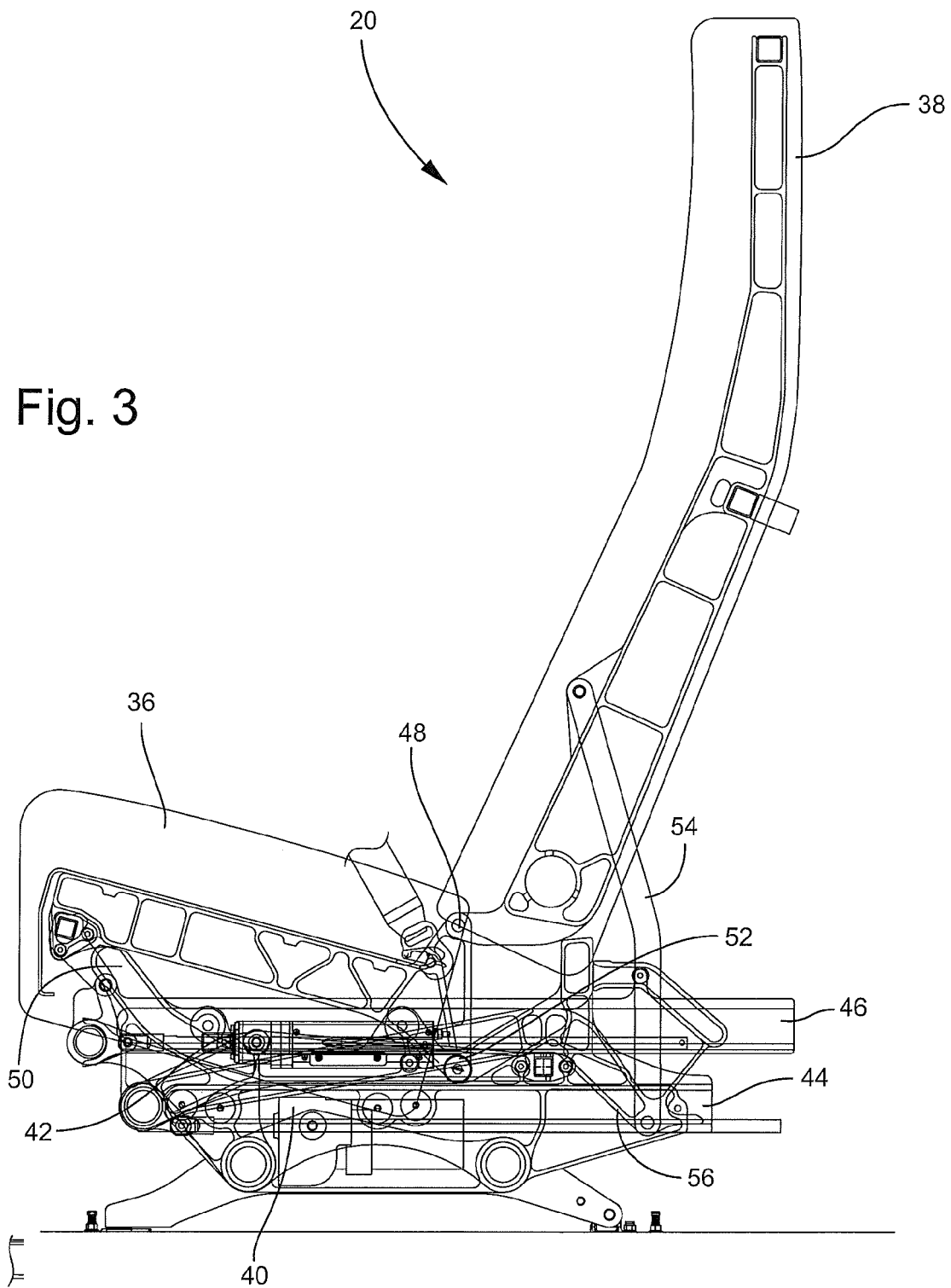
FIG. 3 is a side view of the seat of FIG. 1 with the seat shown in a mid-recline sitting position.

Referring to FIG. 3, the seat 20 is shown just beginning to recline, but not yet horizontally translated forward, as evidence by comparing FIGS. 2 and 3 and the position of the forward ends of the first and second rails 44, 46 relative to each other and the fixed seat base frame 22.

Figure 4:
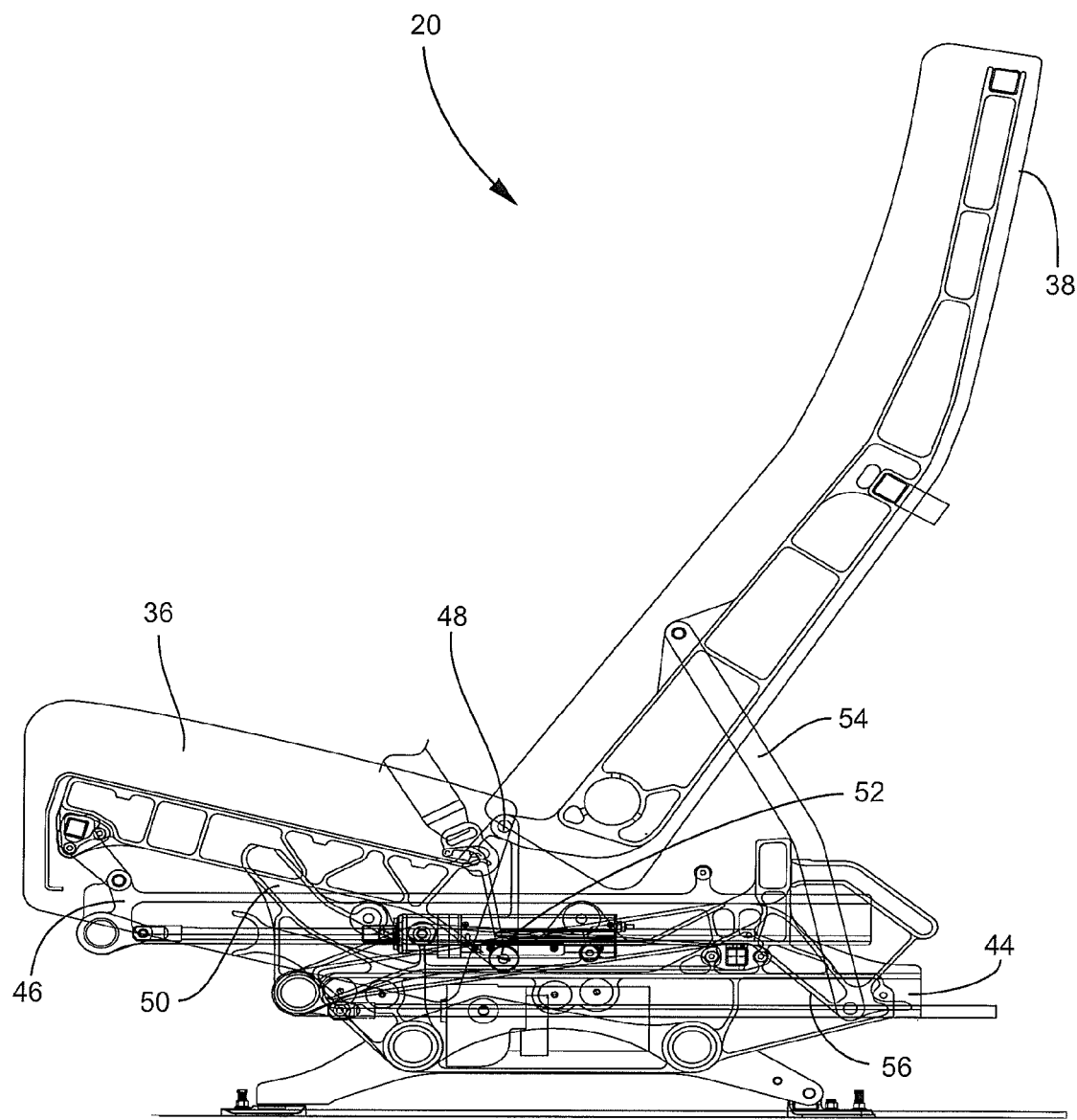
FIG. 4 is a side view of the seat of FIG. 1 with the seat shown in another mid-recline sitting position.

Referring to FIG. 4, the seat 20 is shown mid-recline, but not yet horizontally translated forward, as evidenced by comparing the position of the forward ends of the first and second rails 44, 46. In mid-recline, the roller 52 has traveled partway along the length of the guide path 50, lowering the back end of the seat bottom 36 to provide cradling recline motion.

Figure 5:
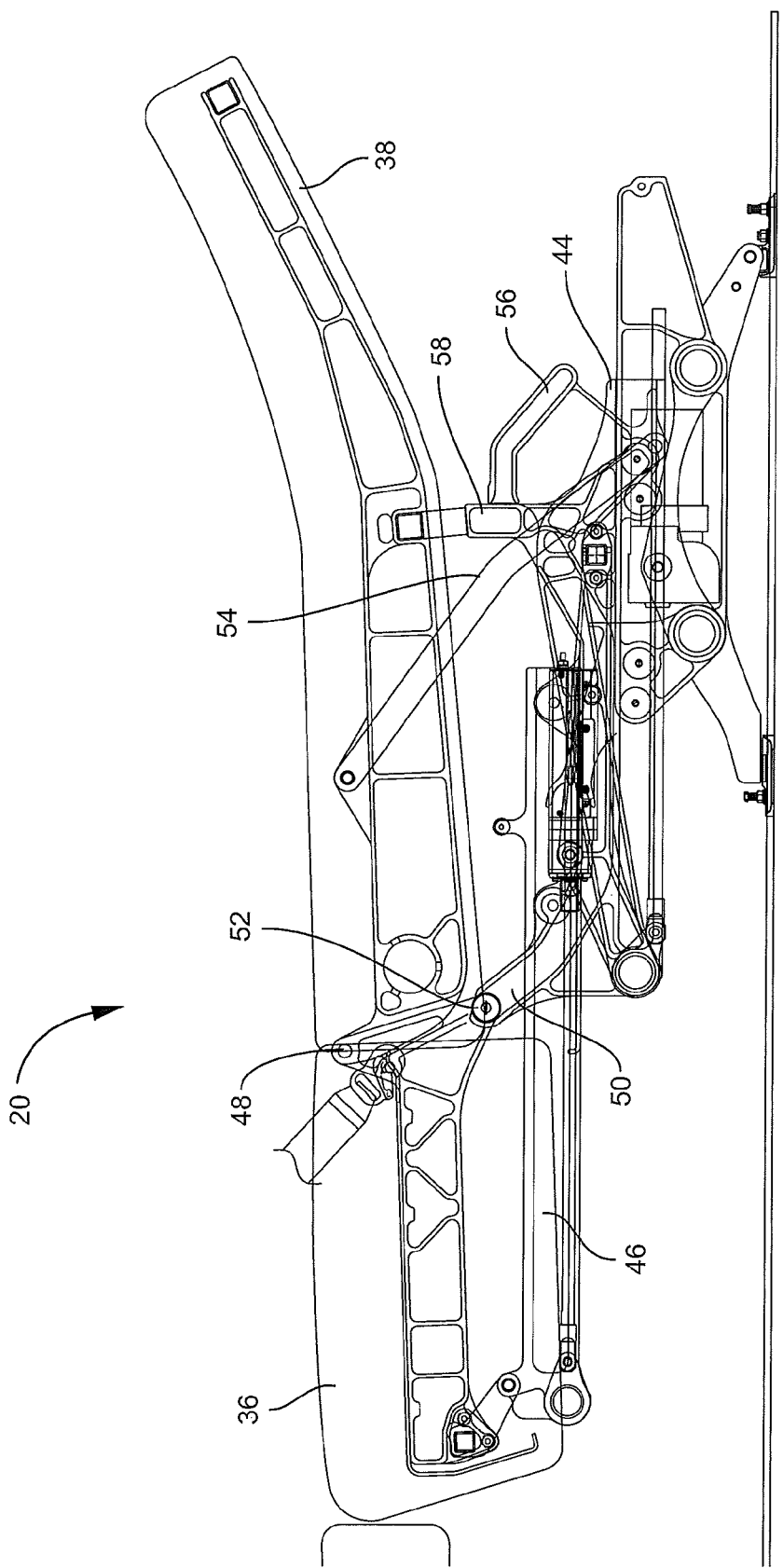
FIG. 5 is a side view of the seat of FIG. 1 with the seat shown in a horizontal sleeping position.

Referring to FIG. 5, the seat 20 is shown fully reclined to form a substantially flat horizontal bed. The bed is not entirely flat due to the optional fixed curvature in the seatback 38. The seat 20 in FIG. 5 is not only fully reclined, but also fully translated forward, as evidenced by comparing FIGS. 2 and 5 and the position of the forwards ends of the first and second rails 44, 46. In the fully reclined and translated position, both the first and second rails 44, 46 are fully extended such that the seat bottom 36 is cantilevered (i.e., extending horizontally well beyond the vertical support of the seat base frame 22. The roller 52 is positioned at the forward end of the guide path 50 when the seatback 38 is fully reclined. Seat recline and translation can be performed simultaneously to speed the time to bed by simultaneously activating both actuators 40, 42. Recline and translation can be performed independently by activating the appropriate one of the actuators 40, 42. The seat 20 may come to rest in the fully reclined position and be supported from below by employing a mechanical stop 58.

The first and second rails 44, 46 may slide along rollers or may be otherwise supported throughout their translating movement. The pathway and arrangement of the guide path 50 can be customized to control the angle of the seat bottom 36 and seatback 38 throughout the reclining motion. Further control of the seat bottom and the seatback angles can be achieved by changing the pivotal attachments points and shape of the various linkage.

The foregoing description provides embodiments of the invention by way of example only. It is envisioned that other embodiments may perform similar functions and/or achieve similar results. Any and all such equivalent embodiments and examples are within the scope of the present invention.

What is claimed is:

1. An aircraft passenger seat configured to recline, comprising:
   a fixed base frame;
   a seatback pivotally connected to a seat bottom;
   a first actuator arranged to drive horizontal translation of a first rail relative to the fixed base frame to horizontally translate the seatback and the seat bottom relative to the fixed base frame independent of seat recline; and
   a second actuator arranged to drive horizontal translation of a second rail relative to the first rail to drive seat recline including both seatback and seat bottom angular adjustment;
   wherein the first and second actuators are arranged in parallel to drive seatback and seat bottom horizontal translation and seat recline in one continuous motion.

2. The aircraft passenger seat of claim 1, wherein the first rail defines a non-linear guide path for guiding movement of the seat bottom engaged therein, and the second rail is arranged to move the seat bottom along the non-linear guide path.

3. The aircraft passenger seat of claim 2, wherein the seat bottom moves from a rearward end of the non-linear guide path when the second actuator is retracted and the seatback is upright, to a forward end of the non-linear guide path when the second actuator is fully extended and the seatback fully reclined.

4. The aircraft passenger seat of claim 1, wherein the seatback and the seat bottom are pivotally attached, and the seatback is attached to the first rail through a rotating link.

5. The aircraft passenger seat of claim 4, wherein the second actuator is attached to a forward end of the seat bottom such that extending the second actuator moves the seat bottom forward, thereby pulling the seatback along therewith such that the rotating link rotates to recline the seatback.

6. The aircraft passenger seat of claim 1, wherein the fixed base frame comprises spaced legs and transverse forward and rear beam tubes.

7. An aircraft passenger seat configured to recline and horizontally translate, comprising:
   a seat base frame;
   a seatback and a seat bottom configured to horizontally translate relative to the seat base frame;
   a first actuator arranged to drive a first rail to drive seatback and seat bottom horizontal translation relative to the seat base frame independent of seat recline; and
   a second actuator arranged to drive a second rail to drive seat recline, the second rail arranged to horizontally translate relative to the first rail to angularly adjust both the seatback and the seat bottom;
   the first and second actuators working in parallel to increase the speed of horizontal translation and combine seat recline into one continuous motion.

8. The aircraft passenger seat of claim 7, wherein the first rail defines a non-linear guide path for guiding movement of the seat bottom engaged therein, and the second rail is arranged to move the seat bottom along the non-linear guide path.

9. The aircraft passenger seat of claim 8, wherein the seat bottom travels from one end of the non-linear guide path to the other as the seatback moves from a fully upright to a fully reclined sitting position.

10. The aircraft passenger seat of claim 7, wherein the seatback and the seat bottom are pivotally attached, and the seatback is attached to the first rail through a rotating link.

11. The aircraft passenger seat of claim 10, wherein the second actuator is attached to a forward end of the seat bottom such that extending the second actuator moves the seat bottom forward, thereby pulling the seatback along therewith such that the rotating link rotates to recline the seatback.

12. The aircraft passenger seat of claim 7, wherein the first and second actuators operate together to speed seatback translation and recline.

13. The aircraft passenger seat of claim 7, wherein the seat base frame is fixed and comprises spaced legs interconnected through transverse forward and rear beam tubes.

* * * * *